J. C. CALDWELL.
FISHING ROD.
APPLICATION FILED MAR. 26, 1919.
1,319,268.
Patented Oct. 21, 1919.
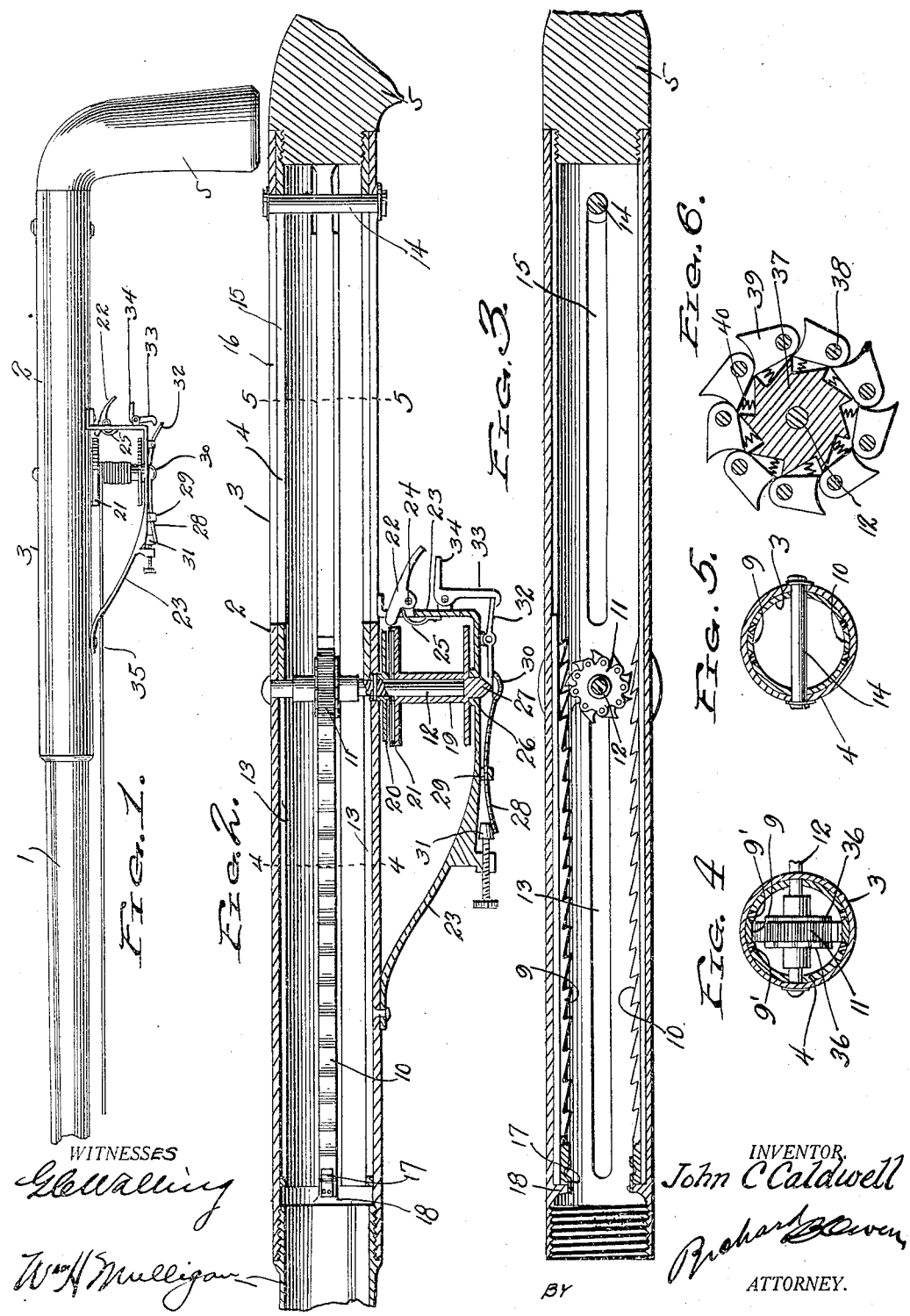
WITNESSES
INVENTOR.
John C Caldwell
BY
ATTORNEY.

UNITED STATES PATENT OFFICE.

JOHN C. CALDWELL, OF MIAMI, FLORIDA.

FISHING-ROD.

1,319,268.  Specification of Letters Patent.  Patented Oct. 21, 1919.

Application filed March 26, 1919. Serial No. 285,233.

*To all whom it may concern:*

Be it known that I, JOHN C. CALDWELL, a citizen of the United States, residing at Miami, in the county of Dade and State of Florida, have invented certain new and useful Improvements in Fishing-Rods, of which the following is a specification.

This invention relates to fishing rods and more particularly to the type used in fly casting.

One of the objects of the invention is to provide a rod having its handle constructed so that a portion may be reciprocated whereby the line may be wound up on the reel and which may also be actuated so that the line may be laid out without moving the movable portions of the handle.

The invention further aims to provide a fishing rod of this character which will have an improved mechanism for releasing the reel whereby the line may be readily released for paying the line out, or which may be actuated so that the paying out of the line may be retarded, thereby especially adapting the pole for use in catching game fish.

The above and additional objects are accomplished by such means as are illustrated in the preferred embodiment of the invention and the accompanying drawings, wherein like numerals of reference denote like or corresponding parts throughout the several views, in which:—

Figure 1 is an elevation of one end of the fishing pole constructed in accordance with my invention.

Fig. 2 is a longitudinal section through one end of the pole.

Fig. 3 is a longitudinal section taken through a plane at right angles to Fig. 2.

Fig. 4 is a transverse section taken on the line 4—4 of Fig. 2.

Fig. 5 is a transverse section taken on the line 5—5 of Fig. 2, and

Fig. 6 is an enlarged detail side elevation of the ratchet wheel forming a part of the invention.

Referring to the drawing in which is illustrated the preferred form of my invention, in which like numerals of reference indicate like or corresponding parts throughout the several views, the fishing rod 1 is provided with a hollow handle 2 having a right angularly projecting hand grip 5 which is preferably in the form of a pistol handle. The handle 2 is composed of telescopically engaged sections 3 and 4, the outer section 3 of which is removably engaged with the end of the body portion of the rod 1 as shown in Fig. 2 of the drawing.

A rack bar 9 is mounted within the inner section 4 of the handle and has a dove-tailed connection by beveling the edges of the rack bar and mounting the same in the guides 9' carried by the section 4 as shown in Figs. 4 and 5. A similar rack bar 10 is carried by the section 4 diametrically opposite the rack bar 9 and the teeth of the two rack bars extend in opposite directions as shown. A ratchet wheel 11, revolubly mounted on a shaft 12 which extends transversely through the inner section 4 and is journaled in the outer section 3. The shaft 12 extends through longitudinal slots 13 formed in the inner section 4 to provide for the longitudinal movement of the section 4 relative to the section 3. Another shaft 14 also extends transversely through the handle 2, slots 15 being provided in the inner section 4 and corresponding slots 16 being provided in the outer section 3 to receive the ends of the shaft 14 whereby telescoping of the two sections 3 and 4 will be permitted.

The rack bar 9 which is dove-tailed to slide in the section 4 extends through a portion only of the length of the said section and is independent thereof while the rack bar 10 extends throughout the length of the section 4 and is connected with the hand grip 5 so that the rack bar 10 is held firmly in fixed position with respect to the inner section 4. The teeth of the rack bar 10, however, extend along the bar for a distance approximately equal to the length of the rack bar 9.

Spring clips 17, carried by projections 18 on the outer section 4 are designed to yieldably engage the inner end of the rack bars 9 and 10 when the sections 3 and 4 are in closed position as shown in Figs. 2 and 3 and these clips will hold the sections against accidental separation when in the position shown in the drawing, in which position the ratchet wheel will be out of engagement with both rack bars.

One end of the shaft 12 is extended beyond the outer section 3 and has revolubly mounted thereon the line reel 19. A disk 20 is fixed to the shaft 12 and has one face corrugated or otherwise suitably roughened to provide a friction clutch disk adapted to engage one end of the reel 19. The reel 19 has end flanges, one of which is provided on its outer surface with a corrugated surface similar to the adjacent surface of the disk 20 whereby when the reel is forced into engagement with the disk 20 the reel will be caused to rotate if the shaft 12 is rotated. This flange of the reel also has an annular lip 21 and a finger lever 22 is mounted on a guard member 23 so that one end of the finger is adapted to engage the lip 21 when the finger is swung on its pivot 24. A spring 25 normally holds the finger out of engagement with the lip. The guard member 23 is fixed to the outer section 3 and is provided with a bearing 26 through which the pointed end 27 of the reel is extended. A flat spring 28 held in position by a loop 29 on the guard member 23 has a cupped end 30 adapted to engage the pointed end 27 of the reel 19 and the opposite end of the spring 28 is engaged by a tensioning member 31 adjustably mounted in a portion of the guard member and adapted to be manipulated so that the tension of the spring 28 may be varied as desired. The cupped portion 30 of the spring is normally held out of engagement with the pointed end 27 of the reel by a lever 32 one end of which is adapted to engage the cupped end 30 of the spring while the other end is engaged with a latch 33 pivotally mounted on the guard member and having a handle portion 34 by which the operator may release the latch from engagement with the lever 32. The reel is provided with the usual line 35 which of course, is secured to the end of the pole 1 in the usual manner.

As shown in detail in Figs. 4 and 6, the ratchet wheel 11 comprises two plates 36 between which is arranged a disk 37. The peripheries of the plate 36 extend beyond the periphery of the disk 37 and are provided with ears forming bearings for the studs 38 upon which are mounted pawls 39 normally projected outwardly from the disk 37 by the coil expansion springs 40 and the ends of the pawls are adapted to engage the teeth of the rack bars 9 and 10. The coil springs 40 are arranged in recesses formed in the periphery of the disk 37 and the pawls are adapted to swing into the recesses when depressed.

When a pull is exerted on the hand grip 5, the clips 17 will be disengaged from the ends of the rack bars 9 and 10 and permit the section 4 to move outwardly carrying with it the rack bar 9 which, by virtue of its engagement with the pawls 39 will cause the ratchet wheel 11 to rotate for imparting turning movement to the shaft 12. By engaging the member 34 so that the latch 33 will be released from the lever 32, the spring 28 will be permitted to engage the pointed end 27 of the reel whereupon the latter will be forced into engagement with the friction disk 20 and since the latter is fixed to the shaft 12 it will be obvious that the reels will be rotated so that the line will be wound up on the reel. When the fish pulls on the line and it is desired to maintain the line under the proper tension, the operator may engage his finger with the end of the brake lever 22 for forcing the latter into engagement with the lip 21 on the reel and frictionally holding the reel against rapid movement. When the ends of the shaft 12 are in the forward ends of the slots 13, forward movement of the rack bar 10 will cause the teeth thereof to engage the pawls of the ratchet wheel to turn the ratchet wheel backwardly and move the parts to the position shown in Figs. 2 and 3 whereupon the ratchet wheel will be out of engagement with both of the rack bars and the operator may govern the length of line paid out by actuating the levers 22 and 32 as above stated.

The foregoing description and accompanying drawings have reference to what might be considered to be the approved or preferred form of my invention. I desire it to be understood that I may make such changes in the construction, combination and arrangement of parts, materials, dimensions, et cetera, as may prove expedient and fall within the scope of the appended claims.

Having thus fully described my invention what I claim as new and desire to secure by Letters Patent, is:—

1. A fishing rod including a handle composed of telescopically engaged sections, means for yieldably holding said sections in retracted position and releasable by an outward pull on one of said sections, a shaft carried by one of said sections and provided with a reel, and means mounted on the shaft and operable on the movement of the other section for rotating the reel.

2. A fishing rod including a handle composed of telescopically engaged sections, rack bars carried by the inner sections and having teeth extending in opposite directions, resilient means carried by the outer section for detachably engaging said rack bars for holding the said inner sections in normal retracted position, a shaft extending transversely through the sections and equipped with a reel, and a ratchet wheel mounted on the shaft and adapted to be engaged by said rack bars upon movement of the said inner section for turning the said ratchet wheel.

3. A fishing rod including telescopically engaged sections, the inner section having longitudinal slots, a shaft extending through said slots and journaled in the outer section, one end of said shaft projecting beyond the outer section, a reel mounted on the said projecting end of the shaft, means fixed to the shaft and releasably engageable with the reel to turn the reel when the shaft is rotated, a ratchet wheel mounted within the inner section and on the said shaft, rack bars carried by the inner face of the inner section and adapted to engage the teeth of the said ratchet wheel, the ends of the said shaft being movable through the slots to permit relative telescopical movement of the sections whereby the said rack bars may engage the teeth of the ratchet wheel to turn the said shaft.

4. A fishing rod including telescopically engaged sections, a shaft carried by the sections, a reel mounted on the said shaft, rack bars carried by the inner face of the inner section, a ratchet wheel mounted within the inner section on the said shaft and engageable with the rack bars, one of the said rack bars being movable independently of the other, and a clutch element fixed to the shaft and adapted for engagement with the reel to turn the reel when the shaft is rotated by the said ratchet wheel.

5. A fish rod comprising telescopically engaged sections, a shaft extending through the sections, one of the sections having slots whereby the shaft may be extended therethrough to be journaled in the outer section, one end of the shaft being extended, a reel mounted on the extended end of the shaft for free rotary movement, a friction disk fixed to the shaft and engageable with one end of the reel, means mounted on the shaft to impart movement to the shaft when the sections are relatively moved, and a spring element disposed at one end of the reel and engageable with the latter to releasably hold the reel in engagement with the said disk whereby the said reel will rotate when the shaft is actuated.

6. A fishing rod including telescopically engaged sections adapted for relatively longitudinal movement, rack bars mounted in the inner section, a transverse shaft having a ratchet wheel engageable with the rack bars to turn the shaft when the sections are longitudinally moved, a reel mounted on one end of the shaft, a guard member carrying a spring engageable with the reel, a friction element secured to the shaft and engageable with the said reel to rotate with the shaft when the said spring forces the reel into engagement with the disk, and means to adjust the said spring.

7. A fishing rod including telescopically engaged sections adapted for relative longitudinal movement, rack bars mounted in the inner section, a transverse shaft having a ratchet wheel engageable with the rack bars to turn the shaft when the sections are longitudinally moved, a reel mounted on one end of the shaft, a guard member carrying a spring engageable with the reel, a friction disk secured to the shaft and engageable with the said reel to rotate with the shaft when the said spring forces the reel into engagement with the disk, an adjustable element disposed near one end of said spring to adjust the tension of the latter, and means to engage the opposite end of the spring for adjusting the tension of the spring to vary the pressure on the end of the said reel.

8. A fishing rod including telescopically engaged sections having a shaft extending therethrough, means mounted on the shaft and on the said sections to impart movement to the shaft when the said sections are relatively longitudinally moved, a reel mounted on one end of the shaft for free rotary movement, a disk having a roughened surface adapted to engage one end of the reel, spring means supported by the outer section to engage one end of the reel for forcing the latter into engagement with the said disk, and means to manually move the said spring element for disengaging the spring element from the said reel.

9. A fishing rod including telescopically engaged sections having a shaft extending therethrough, means mounted on the shaft and on the said sections to impart movement to the shaft when the said sections are relatively longitudinally moved, a reel mounted on one end of the shaft for free rotary movement, a disk having a roughened surface adapted to engage one end of the reel, spring means supported by the outer section to engage one end of the reel for forcing the latter into engagement with the said disk, and means to manually move the said spring element for disengaging the spring element from the said reel, and means engageable with the spring to releasably hold it out of engagement with the said reel.

In testimony whereof I affix my signature in presence of two witnesses.

JOHN C. CALDWELL.

Witnesses:
A. H. ADAMS,
L. C. GARDENS.

Copies of this patent may be obtained for five cents each, by addressing the "Commissioner of Patents, Washington, D. C."